(12) United States Patent
Mitra et al.

(10) Patent No.: US 12,017,649 B2
(45) Date of Patent: Jun. 25, 2024

(54) BLOCKCHAIN SYSTEM TO AID VEHICLE ACTIONS

(71) Applicant: Ford Global Technologies, LLC, Dearborn, MI (US)

(72) Inventors: Pramita Mitra, West Bloomfield, MI (US); Josh Fodale, Ypsilanti, MI (US); Archak Mittal, Canton, MI (US); Eric H. Wingfield, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 747 days.

(21) Appl. No.: 17/032,438

(22) Filed: Sep. 25, 2020

(65) Prior Publication Data
US 2022/0097695 A1 Mar. 31, 2022

(51) Int. Cl.
*B60W 30/10* (2006.01)
*G07C 5/08* (2006.01)
*H04L 9/06* (2006.01)
*H04L 9/00* (2022.01)

(52) U.S. Cl.
CPC ........... *B60W 30/10* (2013.01); *G07C 5/0841* (2013.01); *H04L 9/0618* (2013.01); *B60W 2554/404* (2020.02); *H04L 9/50* (2022.05)

(58) Field of Classification Search
CPC ............ B60W 30/10; B60W 2554/404; G07C 5/0841; G08G 1/0112; G08G 1/0133; G08G 1/0141; G08G 1/095; G08G 1/161; G08G 1/164; G08G 1/22; H04L 9/0618; H04L 9/3239; H04L 9/50; H04W 4/38; H04W 4/44
See application file for complete search history.

(56) References Cited

U.S. PATENT DOCUMENTS

| | | | |
|---|---|---|---|
| 11,151,880 B1* | 10/2021 | Shou | G08G 1/0141 |
| 11,520,342 B2* | 12/2022 | Jiao | G05D 1/0214 |
| 2017/0279774 A1 | 9/2017 | Booz et al. | |
| 2018/0025631 A1* | 1/2018 | Durekovic | G08G 1/161 |
| | | | 701/117 |
| 2018/0061237 A1 | 3/2018 | Erickson et al. | |
| 2018/0067496 A1 | 3/2018 | Prasad et al. | |
| 2019/0287402 A1* | 9/2019 | Aoude | G08G 1/0137 |
| 2019/0347939 A1* | 11/2019 | Kim | B60K 35/23 |
| 2019/0385269 A1* | 12/2019 | Zachary | H04N 7/18 |
| 2020/0202711 A1* | 6/2020 | Martin | G01C 21/3641 |
| 2020/0213826 A1* | 7/2020 | Obaidi | G08G 1/096791 |
| 2020/0213852 A1* | 7/2020 | Obaidi | H04L 9/3239 |
| 2020/0298863 A1* | 9/2020 | Lin | G01S 17/931 |

(Continued)

FOREIGN PATENT DOCUMENTS

WO 2019172905 A1 9/2019

*Primary Examiner* — Peter D Nolan
*Assistant Examiner* — Ce Li Li
(74) *Attorney, Agent, or Firm* — Frank A. MacKenzue; Bejin Bieneman PLC

(57) ABSTRACT

A system comprises a computer including a processor and a memory. The memory storing instructions executable by the processor to cause the processor to receive a blockchain including a record of a vehicle status, wherein the vehicle status comprises at least an intended vehicle operation of a first vehicle; determine a path recommendation for the first vehicle based on at least a vehicle trajectory of a second vehicle; and transmit the path recommendation to the first vehicle.

20 Claims, 9 Drawing Sheets

(56) References Cited

U.S. PATENT DOCUMENTS

| 2020/0307600 A1* | 10/2020 | Sato ........................ G08G 1/167 |
| 2022/0068132 A1* | 3/2022 | Back .................. G06Q 30/0208 |
| 2022/0126871 A1* | 4/2022 | Li ..................... B60W 60/0017 |
| 2023/0058086 A1* | 2/2023 | Vassilovski ......... B60W 60/001 |

* cited by examiner

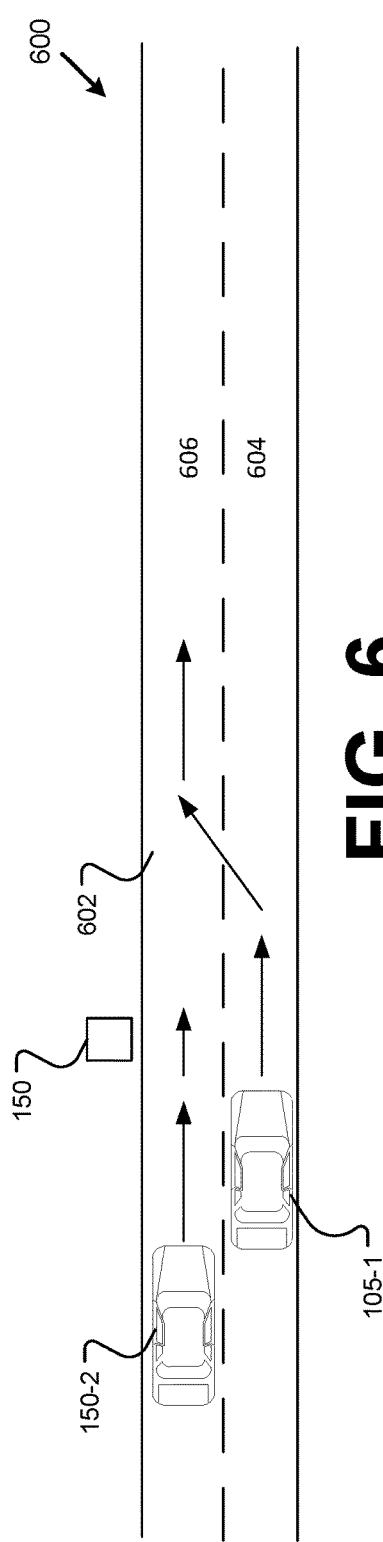

FIG. 6

| Actor | Intention | Speed | Current Lane Position | Trajectory | Instructions |
|---|---|---|---|---|---|
| Vehicle 105-1 | Merge into lane | 70 mph | Lane 604 | Straight | |
| Vehicle 105-2 | Continue Straight | 70 mph | Lane 606 | Straight | |
| Roadside Device 150 | N/A | N/A | N/A | N/A | Vehicle B to slow to 60 mph |
| Vehicle 105-2 | Continue Straight | 60 mph | Lane 606 | Straight | |
| Vehicle 105-1 | Merging Left into lane 606 after time threshold | 70 mph | Lane 604 | Merging left, 5% angle | |
| Vehicle 105-1 | Continue Straight | 70 mph | Lane 606 | Straight | |

FIG. 7

BLOCKCHAIN SYSTEM TO AID VEHICLE ACTIONS

BACKGROUND

Vehicles use sensors to collect data while operating, the sensors including radar, LIDAR, vision systems, infrared systems, and ultrasonic transducers. Vehicles can actuate the sensors to collect data while traveling along roadways. Based on the data, it is possible to determine parameters associated with the vehicle. For example, sensor data can be indicative of objects relative to the vehicle.

BRIEF DESCRIPTION OF THE DRAWINGS

FIG. 6 is an example diagram of an environment including vehicles and a roadside device.

FIG. 7 is an example block of the blockchain.

DETAILED DESCRIPTION

Figure 1:
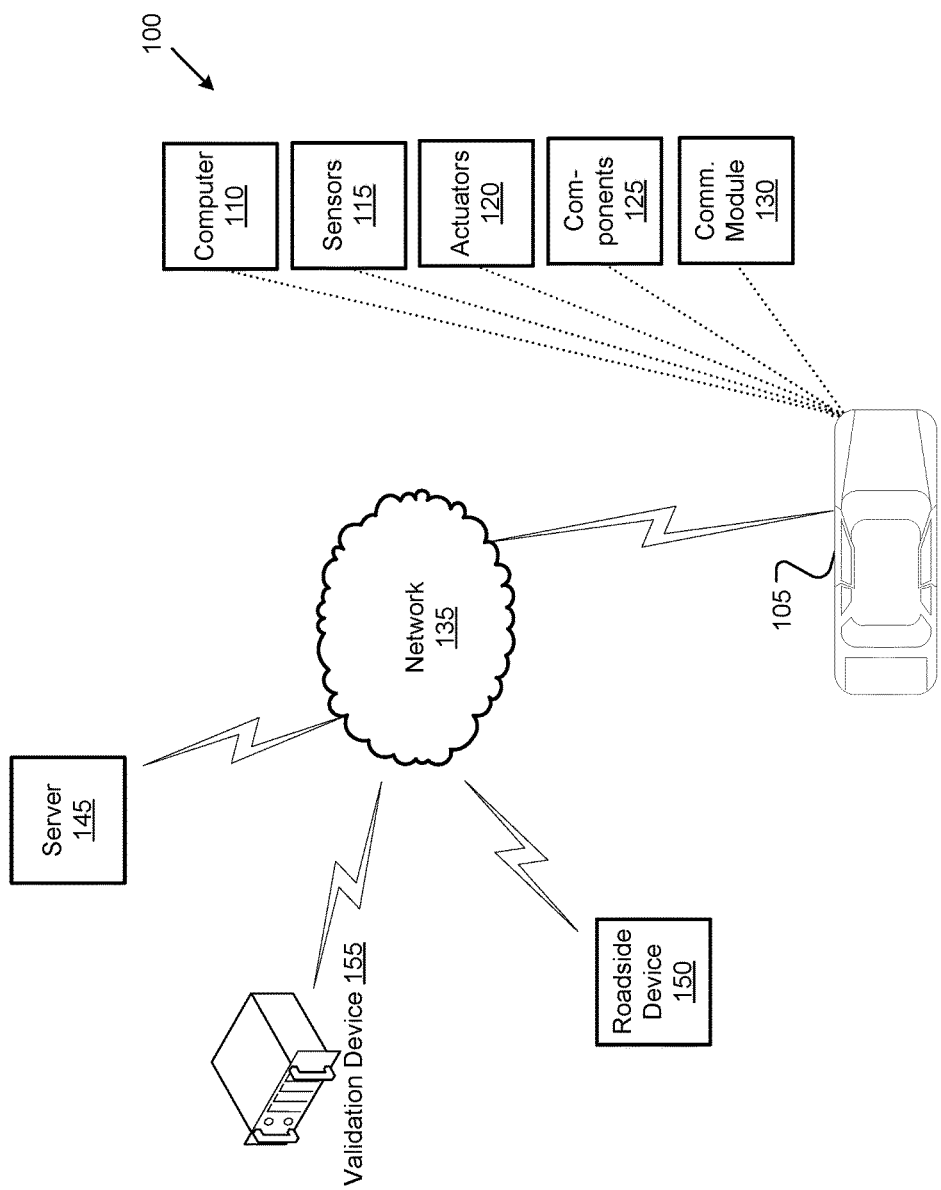
FIG. 1 is a diagram of an example system for generating a path recommendation based on a vehicle status.

A system comprises a computer including a processor and a memory. The memory storing instructions executable by the processor to cause the processor to receive a blockchain including a record of a vehicle status, wherein the vehicle status comprises at least an intended vehicle operation of a first vehicle; determine a path recommendation for the first vehicle based on at least a vehicle trajectory of a second vehicle; and transmit the path recommendation to the first vehicle.

In other features, the blockchain includes a record of vehicle status of the second vehicle, wherein the vehicle status of the second vehicle includes an intended vehicle operation and the vehicle trajectory of the second vehicle of the second vehicle.

In other features, the processor is further programmed to: log the path recommendation to the blockchain.

In other features, the blockchain comprises a blockchain.

In other features, the path recommendation comprises at least one of a lane merge or a speed adjustment.

In other features, the processor is further programmed to determine a path recommendation for the second vehicle based on at least a vehicle trajectory of the first vehicle; and transmit the path recommendation to the second vehicle.

In other features, the processor is further programmed to log the path recommendation for the second vehicle to the blockchain.

In other features, the first vehicle includes a unique identification for accessing the blockchain.

In other features, the unique identification comprises a cryptographic identification A method comprises receiving, at a roadside device, a blockchain including a record of a vehicle status, wherein the vehicle status comprises at least an intended vehicle operation of a first vehicle; determining a path recommendation for the first vehicle based on at least a vehicle trajectory of a second vehicle; and transmitting the path recommendation to the first vehicle.

In other features, the blockchain includes a record of vehicle status of the second vehicle, wherein the vehicle status of the second vehicle includes an intended vehicle operation and the vehicle trajectory of the second vehicle of the second vehicle.

In other features, the method includes logging the path recommendation to the blockchain.

In other features, the blockchain comprises a blockchain.

In other features, the path recommendation comprises at least one of a lane merge or a speed adjustment.

In other features, the method includes determining a path recommendation for the second vehicle based on at least a vehicle trajectory of the first vehicle; and transmitting the path recommendation to the second vehicle.

In other features, the method includes logging the path recommendation for the second vehicle to the blockchain.

In other features, the first vehicle includes a unique identification for accessing the blockchain.

In other features, the unique identification comprises a cryptographic identification.

A system comprises means for receiving a blockchain including a record of a vehicle status, wherein the vehicle status comprises at least an intended vehicle operation of a first vehicle; means for determining a path recommendation for the first vehicle based on at least a vehicle trajectory of a second vehicle; and means for transmitting the path recommendation to the first vehicle.

In other features, the blockchain includes a record of vehicle status of the second vehicle, wherein the vehicle status of the second vehicle includes an intended vehicle operation and the vehicle trajectory of the second vehicle of the second vehicle.

A blockchain can be a distributed electronic ledger. Each blockchain node stores a local copy of a same blockchain ledger. When a blockchain node generates a new block and proposes to link with a previous block, the previous block is stored locally at the generating node as well as all other nodes on the same blockchain. Each blockchain node verifies the new block against their local copy to determine whether consensus is reached within the network. If consensus is reached, the new block is added by each node to their local copy.

The blockchain stores data based on generation of hashes for blocks of data. A hash in the present context is a one-way encryption of data having a fixed number of bits. An example of hash encryption is SHA (Secure Hash Algorithm)-256. The hashes provide links to blocks of data by identifying locations of the block of data in storage (digital memory), for example by use of an association table mapping the hashes of the storage locations. An association table provides a mechanism for associating the hash (which may also be referred to as a hash key) with an address specifying a physical storage device either in a vehicle or a stationary location. The hash for the block of data further provides a code to verify the data to which the hash links. Upon retrieving the block of data, a computer can recompute the hash of the block of data and compare the resulting hash with the hash providing the link. In the case that the recomputed hash matches the linking hash, the computer can determine that the block of data is unchanged. Conversely, a recomputed hash that does not match the linking hash indicates that the block of data or the hash has been changed, for example through corruption or tampering. The hash providing the link to a block of data may also be referred to as a key or a hash key.

FIG. 1 is a block diagram of an example system 100 for determining and transmitting a path recommendation for one or more vehicles. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a communication network 135, the communications module 130 allows the computer 110 to communicate with a server 145. The system 100 also includes a roadside device 150, which can communicate with the server 145 and the vehicle 105 via the communication network 135, and validation devices 155.

The computer 110 includes a processor and a memory. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles 106), etc., relative to the location of the vehicle 105. The vehicle sensors 115 may further include camera sensor(s) 115, e.g. front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to (typically via the communication network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The communication network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

A computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

A roadside device 150 can communicate with one or more vehicles 105 traversing a roadway. The roadside device 150 can receive a vehicle status from each vehicle 105 and simulate a path recommendation for each vehicle 105 based on the vehicle status of the corresponding vehicle and the vehicle status of other vehicles. The roadside device 150 can provide each vehicle 105 access to a portion of the blockchain, e.g., one or more blocks, such that each vehicle 105 can log its vehicle status to a block of the blockchain. The path recommendation can be transmitted to the vehicles 105 and logged to the block of the blockchain.

A validation device 155 stores a copy of the entire blockchain and can provide the roadside device 150 access to a portion of the blockchain. The portion provided to the roadside device 150 may be an unvalidated block including one or more transactions to be validated or a new block. The validate device 155 can validate each block and retain a copy of the block for inspection.

Figure 2A:
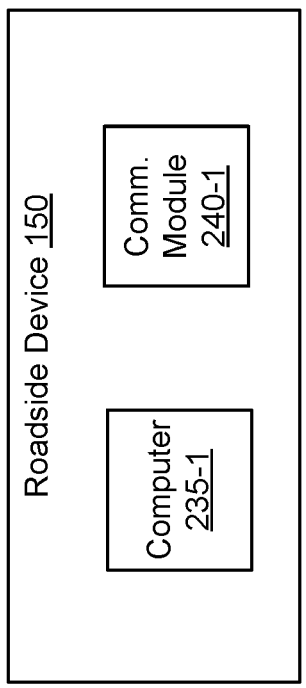
FIGS. 2A and 2B are diagrams of example devices within the system illustrated in FIG. 1.

FIG. 2A is a block diagram of an example roadside device 150. The roadside device 150 includes a computer 235-1 and a communications module 240-1. The computer 235-1 includes a processor and a memory. The memory includes one or more forms of computer-readable media, and stores instructions executable by the computer 235-1 for performing various operations, including as disclosed herein. The communications module 240-1 allows the computer 235-1 to communicate with other devices, such as the vehicle 105, other vehicles, the server 145, other roadside devices 150, and/or other validation devices 155.

Figure 2B:
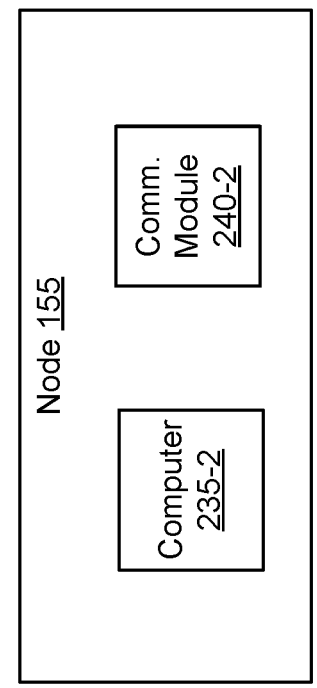

FIG. 2B is a block diagram of an example validation device 155. The validation device 155 includes a computer 235-2 and a communications module 240-2. The computer 235-1 includes a processor and a memory. The memory includes one or more forms of computer-readable media, and stores instructions executable by the computer 235-2 for performing various operations, including as disclosed herein. The communications module 240-2 allows the computer 235-2 to communicate with other devices, such as the vehicle 105, other vehicles, the server 145, roadside devices 150, and/or other validation devices 155.

Figure 3:
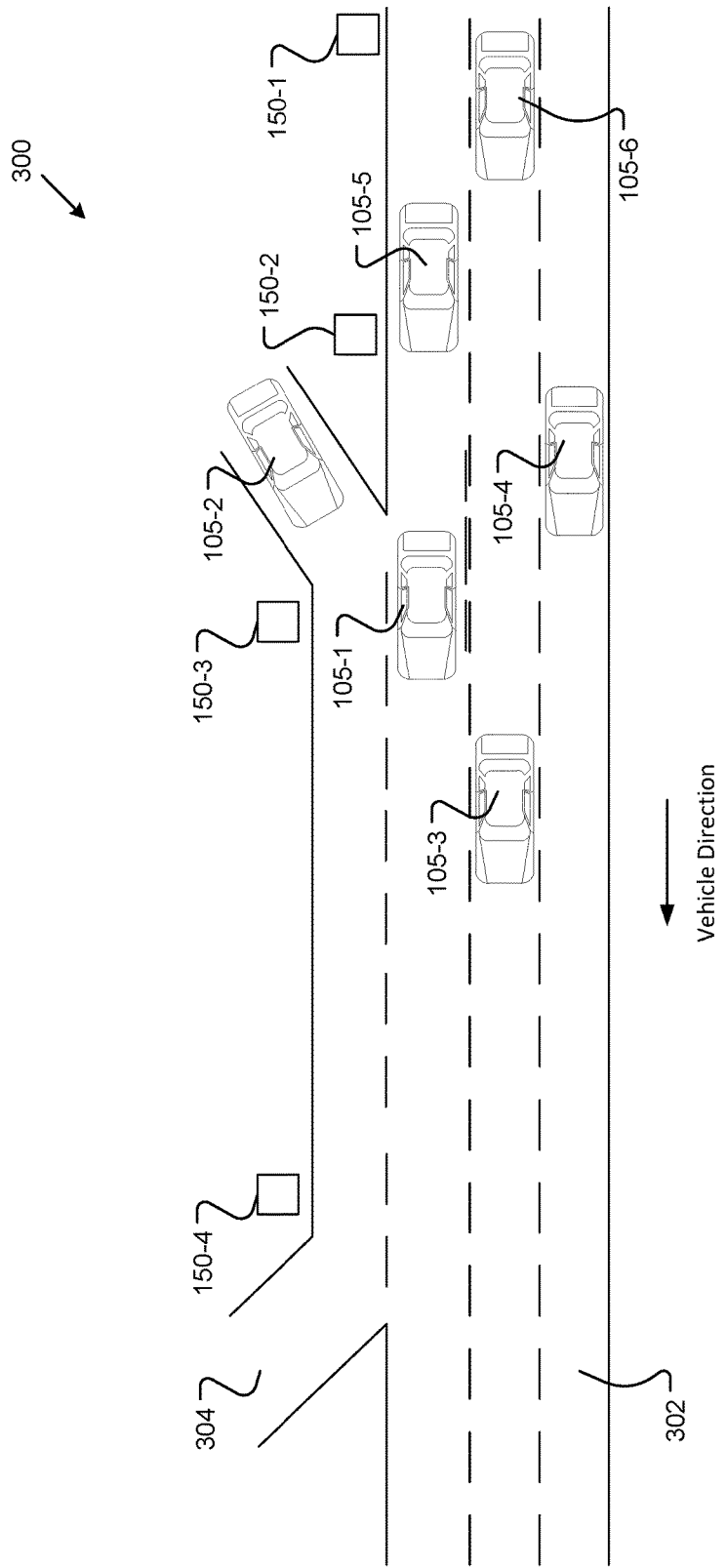
FIG. 3 is an example diagram of an environment for generating a path recommendation.

FIG. 3 illustrates an example environment 300 including a roadway 302, vehicles 105-1 to 105-6, and roadside devices 150-1 to 150-4. As shown, the roadside devices 150-1 to 150-4 can be located along a side of the roadway 302. As the vehicles 105-1 to 105-6 traverse the roadway 302, each vehicle 105-1 to 105-6 can communicate with the roadside devices 150-1 to 150-4 as the vehicles 105-1 to 105-6 travel within communication range of the respective roadside devices 150-1 to 150-4. For example, as a vehicle 105-1 to 105-6 travels along the roadway 302, the vehicle 105-1 to 105-6 can initially establish communication with roadside device 150-1, then roadside device 150-2, then roadside device 150-3, and finally roadside device 150-4 within the environment 300. Each vehicle 105-1 to 105-6 can transmit its vehicle status, which includes an origin of the vehicle, a destination of the vehicle, a route to be traversed by the vehicle, a next lane change of the vehicle, a next exit of the vehicle, and/or sensor data of the vehicle to the nearest roadside device 150-1 to 150-4.

The roadside devices 150-1 to 150-4 can maintain portions of a blockchain used to track and/or maintain vehicle actions. As discussed herein, the validation devices 155 can maintain the entire blockchain for validation purposes. Vehicle 105 actions can include, but are not limited to, continuing on current path, changing lanes, merging, and exiting roadway vehicle.

As described herein, the roadside devices 150-1 to 150-4 can provide access to a portion of the blockchain, determine a vehicle recommendation based on a vehicle's status and a status of other vehicles within the environment 300, transmit the vehicle recommendation to the vehicle, such as the vehicle 105-1, as well as the other vehicles, and compare the path taken to the recommended path. The roadside devices 150-1 to 150-4 can store local copies of portions of the blockchain that can be provided to vehicles for logging, e.g., writing, purposes. The portions of the blockchain provided to the roadside devices 150-1 to 150-4 may correspond to unvalidated blocks of the blockchain or a new block.

For example, as a vehicle, such as the vehicle 105-1, traverses the roadway 302, the vehicle 105-1 initially establishes communication with the roadside device 150-1. During the communication with the vehicle 105-1, the roadside device 150-1 can provide access to a portion of the blockchain to the vehicle 105-1. The vehicle 105-1 computer 110 can create an entry in the blockchain and create a log representing a status of the vehicle 105-1. The roadside device 150-1 may provide the data regarding the vehicle 105-1 and the blockchain to the roadside device 150-2 as the vehicle 105-1 traverses the roadway 302.

The roadside device 150-2 can determine a path recommendation for the vehicle 105-1 based on the status of the vehicle 105-1 and other vehicles 105-2 to 105-6 traveling along the roadway 302, entering the roadway 302, or exiting the roadway 302. The roadside device 150-2 also generates and transmits messages to the vehicle 105-1 and other vehicles 105-2 to 105-6 within a vicinity of the roadside device 150-2 indicating the path recommendation for that vehicle. In an example implementation, the path recommendation may comprise a speed adjustment, a trajectory adjustment, e.g., lane merge, or the like.

The roadside device 150-2 can determine a path recommendation via suitable simulation processes that receive vehicle requirements, vehicle preferences, and/or vehicle parameters, e.g., speed, direction, from the vehicle 105-1 as well as local environmental conditions that include humidity, road curvature, pavement type, road conditions. After receiving the input data, the roadside device 150-2 determines the path recommendation, which includes an optimal path to traverse for each vehicle. The simulation processes can be defined as a set of pretrained models that receive input and generate path recommendations. In an example implementation, the set of pretrained models may comprise deep neural networks, such as recurrent neural networks, long short-term memory networks (LSTMs), and/or gated recurrent units (GRUs).

The roadside device 150-3 can receive data regarding the vehicle 105-1, the path recommendation, and the blockchain. The roadside device 150-3 may update a vehicle path recommendation based on additional vehicles entering the roadway 302 or exiting the roadway 302. Further, as described in greater detail below, the vehicles 105-1 to 105-6 can log vehicle status updates, e.g., speed modification, lane change, etc., to the blockchain in response to the path recommendation.

The roadside device 150-4 can receive data regarding the vehicle 105-1, the path recommendation, and the blockchain from the roadside device 150-3. The roadside device 150-4 can compare the path recommendation to a path actually taken by the vehicle 105-1. It is to be understood that data received, generated, and/or transmitted by the roadside devices 150-1 to 150-4 can logged to the blockchain.

Figure 4:
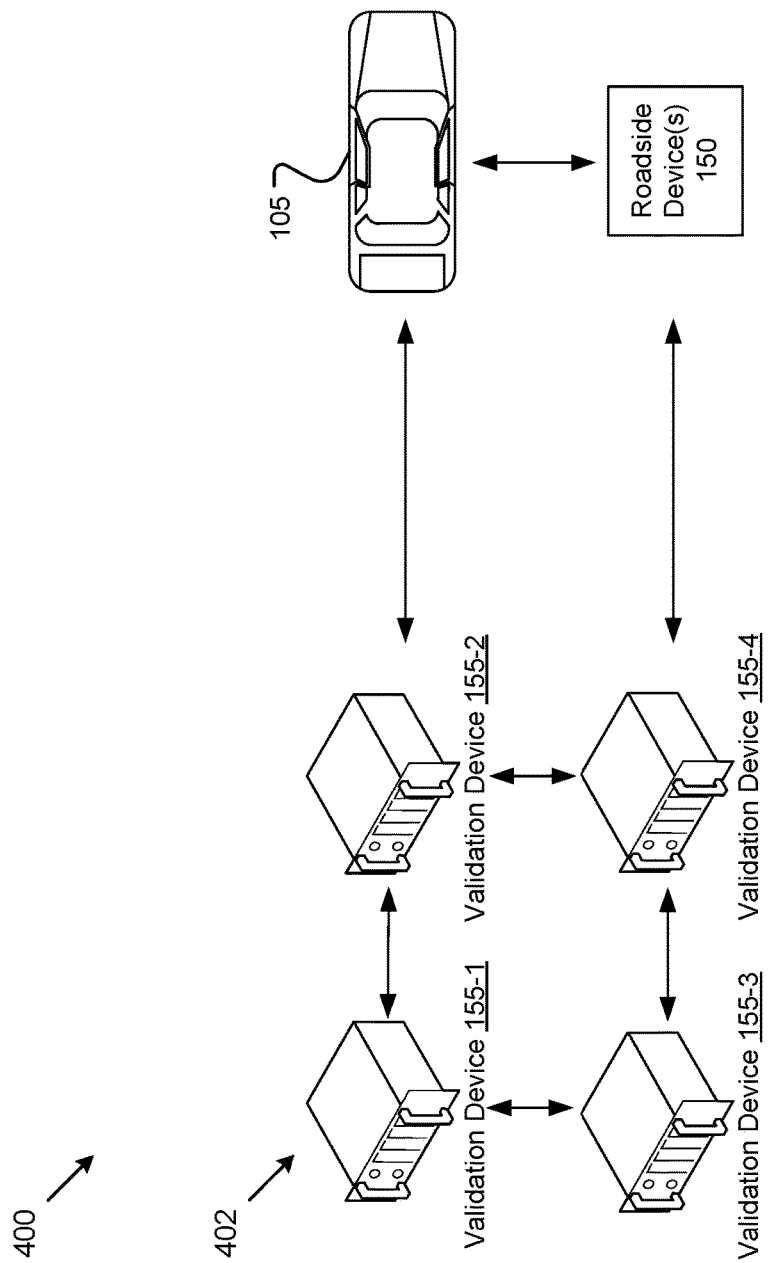
FIG. 4 is an example diagram of a nodes within a blockchain used by the system illustrated in FIG. 1.

FIG. 4 illustrates an example system 400 including a network 402 of validation devices 155-1 through 155-4, a vehicle 105, and a roadside device 150. The validation devices 155-1 through 155-4 can comprise a computing device, such as a desktop computer, a laptop computer, a tablet computer, or the like. The network 402 of validation devices 155-1 through 155-4 may correspond to one or more devices associated with one or more entities (e.g., devices owned, operated, and/or maintained by entities) that are authorized to access or are capable of accessing the blockchain. In some implementations, the network 402 of validation devices 155-1 through 155-4 may have various levels of access capabilities that may permit the network 402 of validation devices 155-1 through 155-4 to view (e.g., read the blockchain) and/or update (e.g., write to the blockchain) vehicle records in the blockchain. For example, the entities may comprise a governmental entity, such as a federal governmental entity or a state governmental entity, one or more automotive entities, such as an automotive original equipment manufacturer (OEM), or the like.

Within the example system 400, the validation devices 155-1 through 155-4 can comprise full nodes that validate transactions and blocks within the blockchain. A full node can comprise a device with full backup of data of the blockchain and that validates blocks of the blockchain. The vehicle 105 and the roadside device 150 can comprise lightweight nodes that access a portion of the blockchain for storing local copies for the accessed portions and/or providing updates to the blockchain. A lightweight node can comprise a device with a partial backup of the blockchain and does not participate in validating the blockchain. It is to be understood that the network 402 may include fewer or additional nodes for validation.

Each of the nodes 155-1 through 155-4 can communicate with the vehicle 105 and/or the roadside device 150 as well as with each of the other validation devices 155-1 through 155-4 within the network 402. The nodes 404-1 through 404-4, the vehicle 105, and the roadside device 150 can communication with one another via the network 135.

Access to the blockchain can be restricted based on an entity, e.g., actor, attempting to access the blockchain. For example, read and write operations can be limited to entities according to access privileges. The access privileges may be based on an identification associated with the entity. For instance, the validation devices 155 may include a lookup table that relates identifications to access privileges.

The blockchain may be immutable, such that no entity can edit, revise, and/or update an entry within the blockchain.

Figure 5:
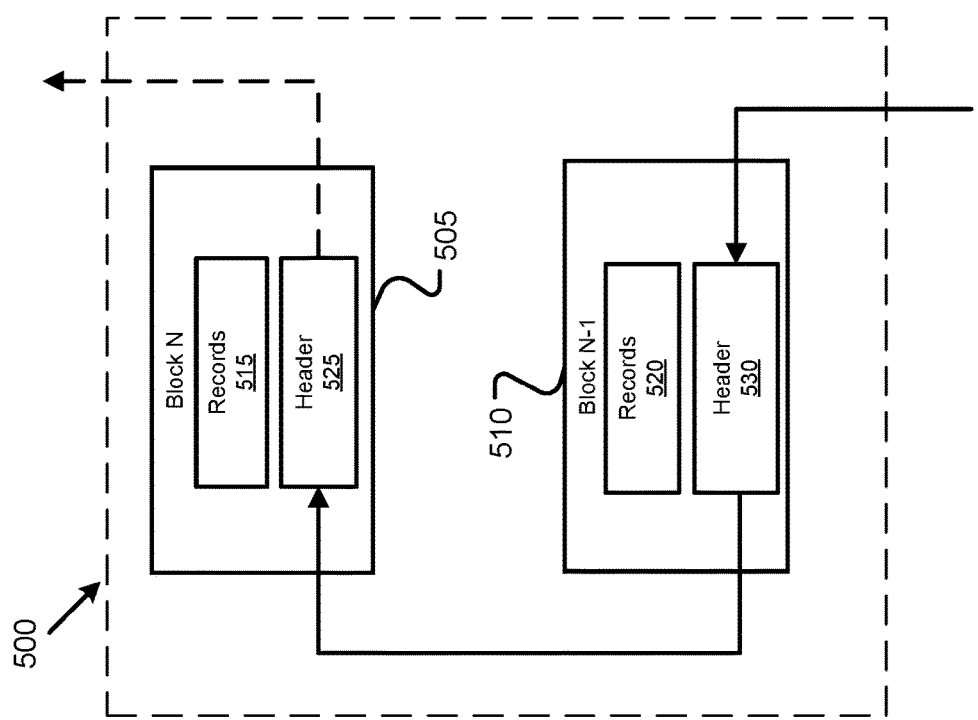
FIG. 5 is an example blockchain including a blockchain having multiple blockchain blocks that store vehicle status data.

FIG. 5 illustrates a blockchain that includes blocks 505, 510 stored by one or more validation devices 155, such as the network 402 of validation devices 155-1 through 155-4 described above. The blockchain 500 can include additional or fewer blocks. Each block 505, 510 maintains verified records 515, 520. The records 515, 520 represent events, records, and/or transactions that have been executed between two or more participants within the blockchain 500. Each record 515, 520 is verified by a majority of the validation devices 155. The records 515, 520 can store financial transactions and/or to non-financial transactions, e.g., transportation records, public keys, vehicle actions, vehicle path, etc. The blocks 505, 510 also includes a respective header 525, 530 including a hash. The hash is derived from the contents of the records 515, 520 in the respective block 505, 510 and can be used to connect blocks 505, 510.

Within the present context, the blocks 505, 510 can store identifiable information corresponding to the vehicle 105. In an example implementation, the vehicle's 105 owner registers the vehicle 105 with an entity, such as a governmental entity or an OEM entity. The registration can include public vehicle information, such as public identification information, corresponding to the vehicle 105, and the public vehicle information can be stored in the blocks 505, 510 of the blockchain.

The blocks 505, 510 can also store unique identifications issued by government entities. For example, the vehicle(s) 105 and the roadside device(s) 150 can include a unique blockchain-compatible identification for authentication and communication purposes. For example, the vehicle(s) 105 and the roadside device(s) 150 can include a unique blockchain-compatible cryptographic identification to mitigate malicious actors from spoofing and/or accessing the blockchain. The roadside device 150 can determine that one or more vehicles can access one or more portions of the blockchain based on the unique identification of the vehicle 105. For instance, the roadside device 150 may include a lookup table that relates identifications to access privileges.

FIG. 6 illustrates an example environment 600 including a first vehicle 105-1, a second vehicle 105-2, and a roadside device 150. As shown, the vehicles 105-1, 105-2 are traversing a roadway 602, and the roadway 602 includes lanes 604, 606. As described below and with respect to FIG. 7, the vehicle 105-1 intends to merge into the lane 606 based on a status of the vehicle 105-1. The vehicles 105-1, 105-2 can establish communication with the roadside device 150, and the roadside device 150 can provide access to one or more portions of the blockchain. Each vehicle 105-1, 105-2 can log or enter its vehicle status to the portion of the blockchain.

FIG. 7 illustrates an example portion of a record 700 of the blockchain accessed and modified by the vehicles 105-1, 105-2 and the roadside device 150 as the vehicles 105-1, 105-2 traverse the roadway 602 in the environment 600. The record 700 includes columns 702, 704, 706, 708, 710, 712 that each store a value or variable described in the column header (i.e., the headers are the top row of the record 700. In an example implementation, the column 702 represents an actor, e.g., vehicle 105-1, vehicle 105-2, roadside device 150, initiating a log entry into the blockchain; the column 704 represents an intended vehicle operation of the actor, e.g., vehicle, based on the status of that vehicle; the column 706 represents a speed of the actor; the column 708 represents a current lane position, e.g., lane 604 or lane 606; the column 710 represents a trajectory of the actor; and the column 712 represents instructions transmitted by the actor, e.g., the roadside device 150, to the other actors, e.g., vehicles 105-1, 105-2. While not illustrated, the record 700 may include additional data, such as timestamp data representing a time the log was entered. The rows of the record 700 can represent the log entry for each of the column values discussed above.

In an example implementation, the vehicle 105-1 may log its status in the blockchain once communication is established with the roadside device 150. As described above, a portion of the blockchain can be sent to the vehicle 105-1 once communication is established. The status may indicate that the vehicle 105-1 intends to merge into lane 604 from lane 602. The vehicle 105-2 can also be provided a portion of the blockchain and can log its presence. The logs can be updated in the blockchain of the roadside device 150.

In response to the updates, the roadside device 150 determines path recommendations for the vehicles 105-1, 105-2 based on the status data, e.g., intended vehicle operation, current lane position, speed, trajectory, timestamp, etc. As discussed above, the path recommendation comprises a speed adjustment, a trajectory adjustment, or the like. The roadside device 150 can estimate the trajectories of the vehicles 105-1, 105-2 based on the status data and calculate the path recommendation. The roadside device 150 may calculate the path recommendations by simulating a vehicle 105 trajectory and positions at varying speeds. For example, the roadside device 150 may determine that the path recommendation for the vehicle 105-2 is to modify its speed to sixty (60) miles per hour (mph) and for the vehicle 105-1 to merge into the lane 606 after a determined time threshold. The time threshold may be calculated by the roadside device 150 based on an amount of time the vehicle 105-1 clears the vehicle 105-2 after the vehicle 105-2 adjusts its speed. The roadside device 150 can encapsulate a message including the path recommendation for each vehicle 105-1, 105-2 and transmit the messages to the vehicles 105-1, 105-2. The path recommendation can be logged to the blockchain for later access.

The vehicles 105-1, 105-2 can log an updated status into the blockchain. For example, the vehicle 105-2 can log that it is adjusting speed, and the vehicle 105-1 can log that it is merging at a given angle. The updated blockchain can be uploaded to a validation device 155 for validation. It is to be understood that if communication is not available between the roadside device 150 and any validation devices 155, the roadside device 150 can upload the updated blockchain once communication is established.

Figure 8:
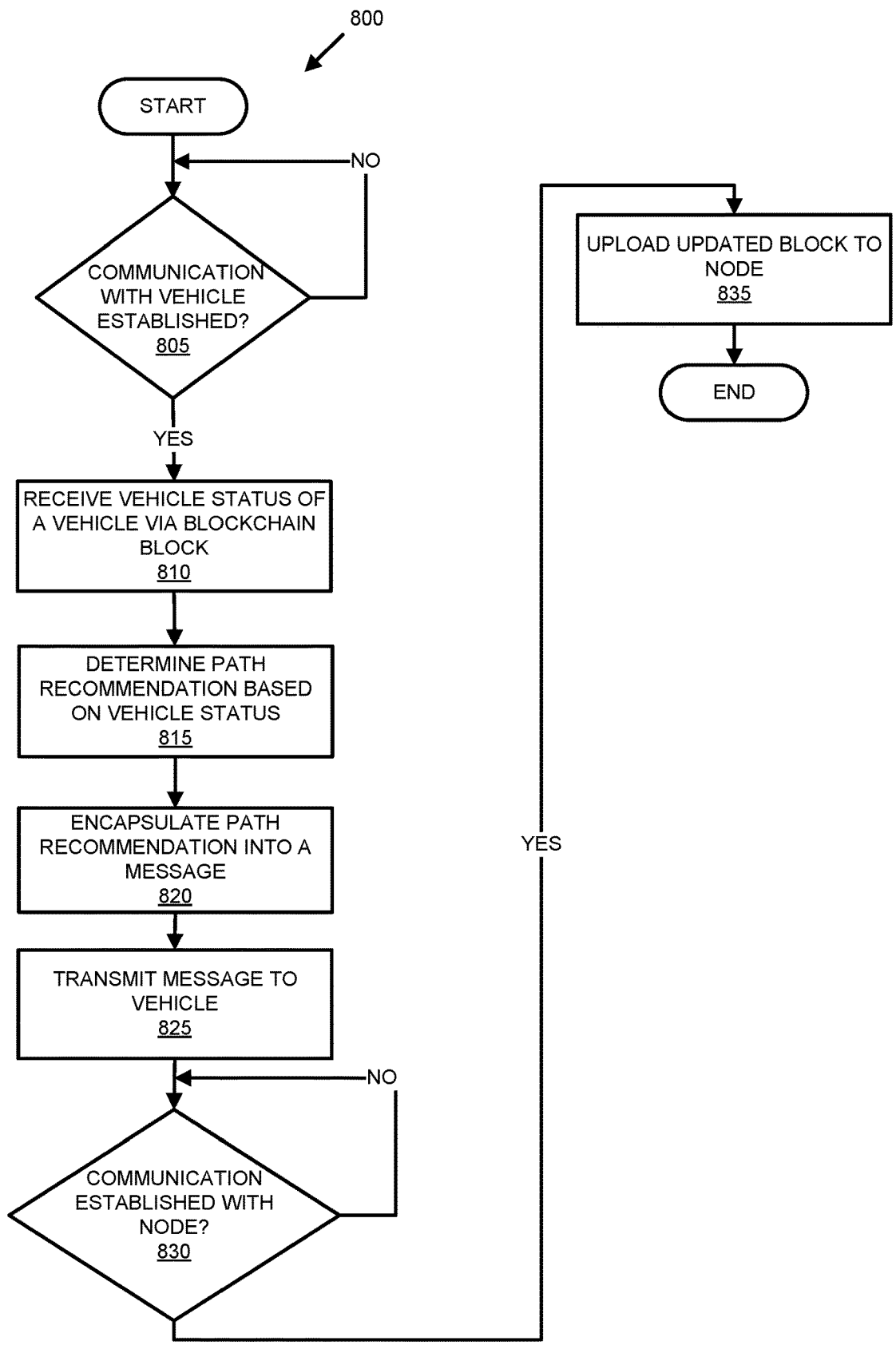
FIG. 8 is a flow diagram illustrating an example process for communicating with one or more vehicles and generating a path recommendation based on a vehicle status from one or more vehicles.

FIG. 8 illustrates a flow diagram of an example process 800 for communicating with one or more vehicles and generating a path recommendation based on a vehicle status from one or more vehicles 105. Blocks of the process 800 can be executed by the computer 235-1 of the roadside device 150.

The process 800 begins at block 805, in which a determination is made whether communication has been established with a vehicle 105. For example, as the vehicle 105 is traveling through an environment, the vehicle 105 computer 110 may establish communication with the roadside device 150 once the vehicle 105 is within proximity of the roadside device. If communication has not been established, the process 800 returns to block 805.

If communication is established, a vehicle status of the vehicle 105 is received at block 810 via the blockchain. As described above, the vehicle status can include an intended vehicle operation based on a vehicle path, a current lane position, a speed, a trajectory, a timestamp, or the like. The roadside device 150 can provide a portion of the blockchain such that the vehicle 105 can log the vehicle status within a record of the blockchain. The blockchain can then be provided to the roadside device 150 by the vehicle 105. In some instances, the blockchain can be updated by the roadside device 150 based on a vehicle status provided by the vehicle 105 to the roadside device 150.

Next, at a block 815, a recommended path for the vehicle 105 is determined. The roadside device 150 computer 235-1 can calculate the path recommendations, which is described in greater detail below with respect to FIG. 9, by estimating a vehicle 105 trajectory and positions of the vehicle 105 at varying speeds with respect to other vehicles based on a vehicle status of those vehicles. In an example implementation, the roadside device 150 may access a lookup table that relates estimate trajectories to path recommendations.

At block 820, one or more messages including the path recommendation are encapsulated according to a communication protocol. The encapsulation of the path recommendation may abstract the message to allow for communication with vehicles manufactured by different vehicle manufacturers, e.g., hardware agnostic. At block 825, the one or more encapsulated messages are transmitted to one or more vehicles. At block 830, a determination is made whether communication is established with a validation device 155. If communication is not established, the process 800 returns to block 830. Otherwise, at block 835, an updated blockchain is uploaded to the validation device 155 for validation. The process 800 then ends.

Figure 9:
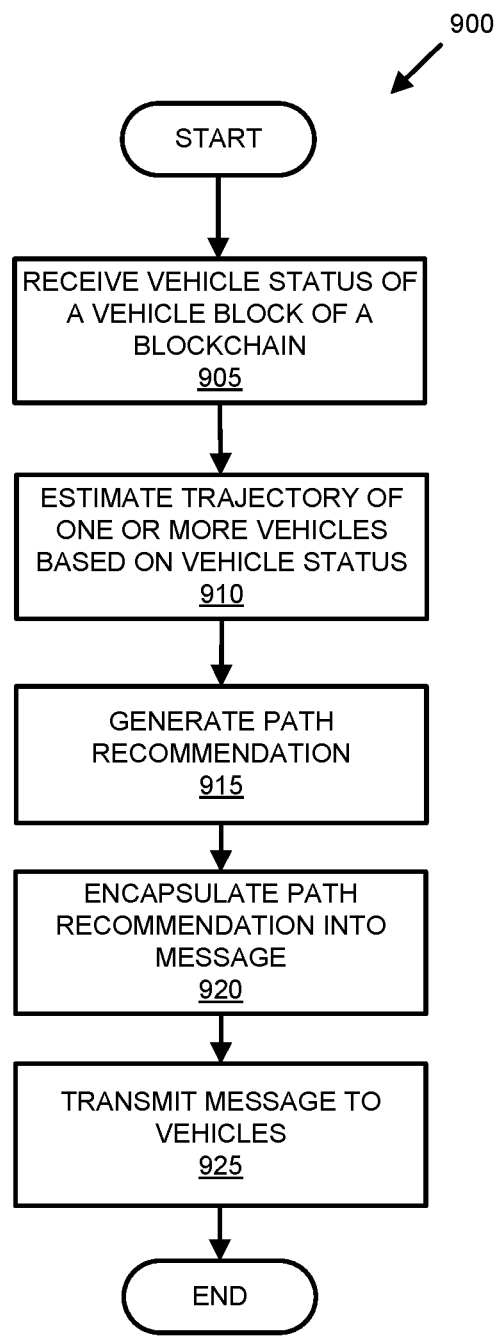
FIG. 9 is a flow diagram illustrating an example process for generating a path recommendation based on a vehicle status.

FIG. 9 illustrates a flow diagram of an example process 900 for generating a path recommendation for a vehicle 105. Blocks of the process 900 can be executed by the computer 235-1 of the roadside device 150.

The process 900 begins at block 905, in which a vehicle status corresponding to one or more vehicles 105 is received. The vehicle status can comprise an origin of the vehicle, a destination of the vehicle, a route to be traversed by the vehicle, a next lane change of the vehicle, a next exit of the vehicle, and/or sensor data of the vehicle(s) 105. The vehicle status can be logged to a block of the blockchain accessible to the vehicle 105 and the roadside device 150.

At block 910, the computer 235-1 estimates a trajectory of one or more vehicles 105 based on corresponding vehicles statuses. In an example implementation, the computer 235-1 estimate a trajectory based on a path of the vehicle 105, a path of other vehicles proximate to other vehicles, a next lane change of the vehicle 105, a next lane change of the other vehicles, a speed of the vehicle 105, and/or a speed of the other vehicles. Using the estimated trajectory, the computer 235-1 generates a path recommendation for the vehicle 105 and the other vehicles proximate to the vehicle 105 at block 915. The path recommendation can include modifying a speed of the vehicle 105 and/or the other vehicles. The path recommendation can also include modifying a performing a lane change, e.g., merge, based on a position of the vehicle 105 relative to the other vehicles. For instance, the computer 235-1 can estimate a time interval that the vehicle 105 should perform the lane change after one or more vehicles adjust their vehicle speed.

At block 920, the computer 235-1 encapsulates the path recommendation into a message. At block 925, the computer 235-1 transmits the encapsulated message(s) to the vehicle 105 and the other vehicles. The process 900 then ends.

Figure 10:
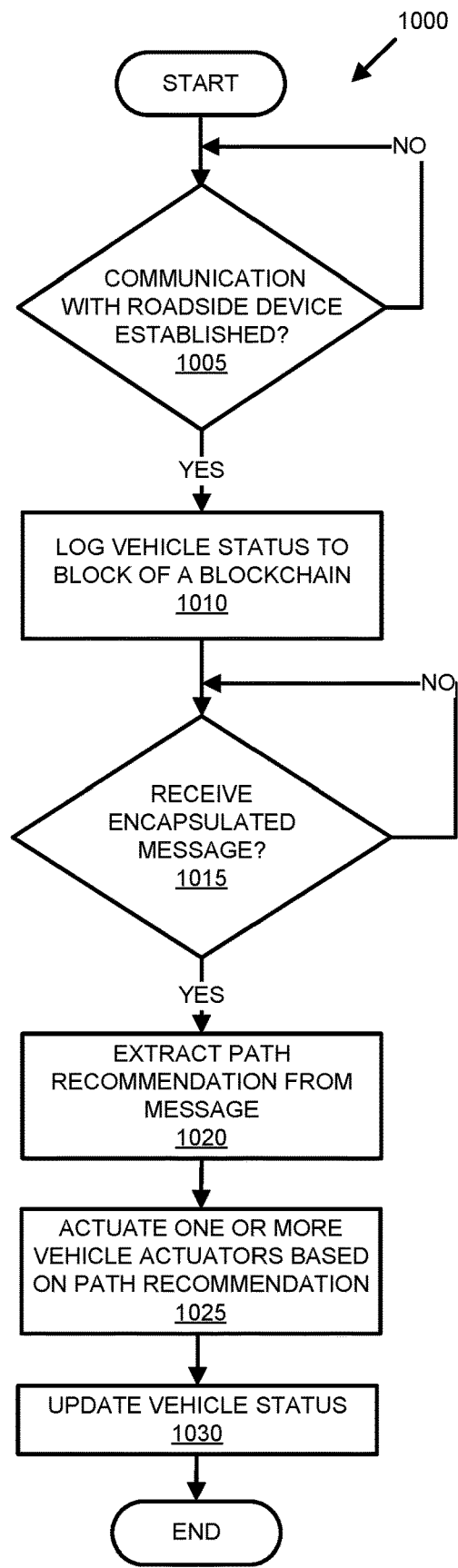
FIG. 10 is a flow diagram illustrating an example processor for actuating one or more vehicle actuators based on a path recommendation.

FIG. 10 illustrates a flow diagram of an example process 1000 for communicating with a roadside device 150 and altering a vehicle 105 action based on a received encapsulated message. Blocks of the process 1000 can be executed by the computer 110 of the roadside vehicle 105.

The process 1000 begins at block 1005, in which a determination is made whether communication has been established with a roadside device 150. If communication has not been established, the process 1000 returns to block 1005. If communication is established, a vehicle status of the vehicle 105 is logged into a block of the blockchain at block 1010. At block 1015, a determination is made whether an encapsulated message has been received from the roadside device 150. If the encapsulated message has not been received, the process 1000 returns to block 1015. If the encapsulated message has been received, the path recommendation is extracted at block 1020. For example, the computer 110 may extract the path recommendation according to one or more communication protocols.

At block 1025, one or more actuators 120 are actuated based on the message. For example, the computer 110 can transmit instructions to one or more actuators 120 to adjust a speed of the vehicle 105 and/or perform a lane change. The vehicle status is updated at block 1030. For example, the computer 110 can log the updated vehicle status to a block of the blockchain based on the actuation of the vehicle 105 actuators. The process 1000 then ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
    a first computer including a first processor and a first memory, the first memory storing instructions executable by the first processor to cause the first processor to:
        receive a blockchain including a record of a vehicle status, wherein the vehicle status comprises at least an intended vehicle operation of a first vehicle to move the first vehicle to a new road lane;
        determine a path recommendation for the first vehicle based on at least a vehicle trajectory of a second vehicle; and
        transmit the path recommendation to the first vehicle; and
    a second computer including a second processor and a second memory, the second memory storing instructions executable by the second processor to cause the second processor to control the first vehicle based on the path recommendation.

2. The system of claim 1, wherein the blockchain includes a record of vehicle status of the second vehicle, wherein the vehicle status of the second vehicle includes an intended vehicle operation and the vehicle trajectory of the second vehicle.

3. The system of claim 1, wherein the first processor is further programmed to: log the path recommendation to the blockchain.

4. The system of claim 1, wherein the blockchain comprises a blockchain.

5. The system of claim 1, wherein the path recommendation comprises at least one of a lane merge or a speed adjustment.

6. The system of claim 1, wherein the first processor is further programmed to:
    determine a path recommendation for the second vehicle based on at least a vehicle trajectory of the first vehicle; and
    transmit the path recommendation to the second vehicle.

7. The system of claim 6, wherein the first processor is further programmed to:
    log the path recommendation for the second vehicle to the blockchain.

8. The system of claim 1, wherein the first vehicle includes a unique identification for accessing the blockchain.

9. The system of claim 8, wherein the unique identification comprises a cryptographic identification.

10. A method comprising:
    receiving, at a roadside device, a blockchain including a record of a vehicle status, wherein the vehicle status comprises at least an intended vehicle operation of a first vehicle to move the first vehicle to a new road lane;
    determining a path recommendation for the first vehicle based on at least a vehicle trajectory of a second vehicle;
    transmitting the path recommendation to the first vehicle; and
    controlling the vehicle based on the path recommendation.

11. The method of claim 10, wherein the blockchain includes a record of vehicle status of the second vehicle, wherein the vehicle status of the second vehicle includes an intended vehicle operation and the vehicle trajectory of the second vehicle.

12. The method of claim 10, further comprising logging the path recommendation to the blockchain.

13. The method of claim 10, wherein the blockchain comprises a blockchain.

14. The method of claim 10, wherein the path recommendation comprises at least one of a lane merge or a speed adjustment.

15. The method of claim 10, further comprising:
    determining a path recommendation for the second vehicle based on at least a vehicle trajectory of the first vehicle; and
    transmitting the path recommendation to the second vehicle.

16. The method of claim 15, further comprising:
    logging the path recommendation for the second vehicle to the blockchain.

17. The method of claim 10, wherein the first vehicle includes a unique identification for accessing the blockchain.

18. The method of claim 17, wherein the unique identification comprises a cryptographic identification.

19. A system comprising:
    means for receiving a blockchain including a record of a vehicle status, wherein the vehicle status comprises at least an intended vehicle operation of a first vehicle to move the first vehicle to a new road lane;
    means for determining a path recommendation for the first vehicle based on at least a vehicle trajectory of a second vehicle;
    means for transmitting the path recommendation to the first vehicle; and
    means for controlling the first vehicle based on the path recommendation.

20. The system of claim 19, wherein the blockchain includes a record of vehicle status of the second vehicle, wherein the vehicle status of the second vehicle includes an intended vehicle operation and the vehicle trajectory of the second vehicle.

* * * * *